United States Patent [19]
Taylor

[11] Patent Number: 5,262,710
[45] Date of Patent: Nov. 16, 1993

[54] BATTERY CHARGER ASSEMBLY

[75] Inventor: Terrance N. Taylor, Barrington, Ill.

[73] Assignee: Motorola, Inc., Schaumburg, Ill.

[21] Appl. No.: 966,629

[22] Filed: Oct. 26, 1992

[51] Int. Cl.$^5$ .................... H01M 10/46; H01M 10/44
[52] U.S. Cl. ........................................... 320/2; 320/15
[58] Field of Search ................................... 320/2, 15

[56] References Cited

U.S. PATENT DOCUMENTS

| | | | |
|---|---|---|---|
| 4,092,580 | 5/1978 | Prinze | 320/2 |
| 5,144,217 | 9/1992 | Gardner et al. | 320/2 |
| 5,148,094 | 9/1992 | Parks et al. | 320/2 |
| 5,157,318 | 10/1992 | Wang | 320/2 |
| 5,162,719 | 11/1992 | Tomura et al. | 320/2 |

Primary Examiner—R. J. Hickey
Attorney, Agent, or Firm—Robert H. Kelly

[57] ABSTRACT

A battery charger assembly for applying a charging current to a rechargeable battery pack having at least one battery cell. Charging circuitry is supported within a housing body and includes coupling electrodes which protrude beyond a front side wall surface of such housing body. Gripper arms are hingedly-connected to the housing body to protrude beyond the front side wall of the housing body. The battery pack to be recharged is positioned between the gripper arms which generate a gripping force upon opposing sides of the battery pack to maintain the battery pack at a charging position whereat the charging current is applied to the battery cells of the battery pack.

20 Claims, 3 Drawing Sheets

BATTERY CHARGER ASSEMBLY

BACKGROUND OF THE INVENTION

The present invention relates generally to battery charging apparatus and methods therefor, and, more particularly, to a battery charger having gripper arms for gripping surfaces of a battery pack to maintain the battery pack in position at a charging position, thereat to permit application of a charging current by charging circuitry of the battery charger to the battery cells of the battery pack.

Oftentimes, an electrical device is constructed to be of a design to permit powering thereof by one or more batteries. In some instances, the use of a battery to power the electrical device is necessary when the electrical device is not, or cannot be, positioned proximate to a permanent power supply. In other instances, a battery is used to power the electrical device to increase the portability of the device as no power cable is required to interconnect the electrical device to a permanent, power supply. Typically, the one or more batteries used to power the electrical device are carried directly with the electrical device.

However, because a battery stores only finite amounts of energy, operation of the electrical device is limited by the energy storage capacity of the battery. Powering of the electrical device by the battery discharges the battery, and, once the battery becomes discharged, replacement of the battery is required to permit continued operation of the electrical device. Increasing the size (and weight) of the battery, while increasing the energy storage capacity of the battery, reduces the portability of the electrical device when the battery is carried therewith. Accordingly, a compromise is made between increased battery energy storage capacity and reduced portability of the electrical device.

A portable or transportable radiotelephone is one such electrical device which is typically powered by a battery power supply. The battery power supply is typically carried directly with the radiotelephone, and is of a size and weight which does not unduly constrain the portability of the radiotelephone.

When the radiotelephone is operative to send or to receive a modulated signal, the radiotelephone typically dissipates power at a rate of up to three watts. Conventional battery power supplies constructed to power such radiotelephones are of energy storage capacities permitting power dissipation at such a rate (i.e., operation of the radiotelephone) for approximately a one hour time period. If the battery power supply operative to power the radiotelephone is not initially fully charged, the operational period during which the radiotelephone may be operated at such a power level is, of course, commensurately reduced.

Once the battery power supply has been discharged beneath a certain level, the battery powering the radiotelephone must be removed and replaced with a new battery power supply to permit continued operation of the radiotelephone.

Rechargeable batteries have been developed and are commercially available. Some of such commercially-available, rechargeable batteries are of constructions designed for use to power radiotelephones. The use of rechargeable batteries is advantageous as, after discharge of the batteries, the rechargeable batteries may be recharged, and then reused. Some constructions of rechargeable batteries may be recharged, and reused, up to, and even in excess of, five hundred times.

A rechargeable battery construction used to power a portable radiotelephone is typically comprised of several discrete battery cells, connected in a series (or other) connection, and housed within a common housing. The housing, together with the battery cells, is sometimes referred to as a battery pack. For purposes of simplicity, such a construction is most times referred to simply by the term "battery." The present disclosure utilizes such simplified terminology except when the more precise terminology is required.

The batteries may be constructed to be of various energy storage capacities. For instance, by appropriately increasing the number of battery cells disposed in a single battery pack comprising the battery, the energy storage capacity of the battery may be increased.

Rechargeable batteries of various energy storage capacities for powering a portable radiotelephone are commercially available. When selecting amongst these various batteries, a user makes the aforementioned compromise between increased battery energy storage capacity and reduced portability of the radiotelephone. That is to say, a user selecting a battery power supply of increased energy storage capacity does so at the expense of an increase in the size and weight of the battery power supply so selected. Conversely, a user selecting a battery power supply of reduced size and weight does so at the expense of a decrease in the energy storage capacity of the battery power supply so selected.

A battery used to power a portable radiotelephone (or other electronic device) is usually device-specific. That is, the battery is constructed to permit the battery terminals thereof to be connected readily to corresponding contacts of a radiotelephone of a particular construction (or of an other electronic device of a particular construction). The battery terminals are positioned to facilitate connection with the contacts of the radiotelephone (or other electronic device). Typically the housing of the battery also includes structure to affix the battery to the radiotelephone to permit carriage of the battery with the radiotelephone. Batteries constructed to power other electronic devices are oftentimes similarly constructed.

Battery charging apparatus is also commercially available to permit recharging of rechargeable batteries. A battery charger comprising such battery charging apparatus is typically comprised of support structure for supporting one or more batteries, and charging circuitry for supplying a charging current of desired characteristics which charges the rechargeable battery when suitably positioned upon the support structure to connect the batteries to the charging circuitry of the battery charging apparatus.

Most frequently, a battery charger is coupled to an external power supply (typically, a conventional, electrical outlet of a household power supply). The battery charging circuitry is operative to convert the electrical characteristics of the externally-supplied power of the external power supply into a charging current of desired characteristics to be applied to the battery. The energy of the charging current applied to the rechargeable battery is converted into chemical energy which is stored by the battery. Application of such charging current to the rechargeable battery over the elapsed period of time permits the rechargeable battery to become fully recharged. The time period required to charge fully the rechargeable battery is dependent upon the battery type and energy storage capacity, the extent to which the battery has been discharged, and the magnitude of the charging current applied to the battery.

Certain battery chargers are of constructions which supply a relatively small magnitude current (such as, for example, C/10 value wherein C is the 1-hour capacity of a battery) to the battery, and battery chargers of other constructions supply a significantly larger current (such as, for example, C value) to the battery. Application of the large magnitude current to the battery is referred to as fast charging of the battery. Application of a small magnitude current to the battery is referred to as trickle charging of the battery. Several battery chargers are of constructions which permit the application of either the large current (i.e., the fast charging current) or the relatively small current (i.e., the trickle charging current) to the battery to recharge the battery thereby.

With the continual reduction in the physical dimensions of many electronic devices, the convenience of use of such devices has increased. In the particular instance of portable radiotelephones, the continual reduction in the dimensions of the portable radiotelephones has permitted convenient carriage of such radiotelephones by a user.

However, and as noted hereinabove, all battery power supplies are of finite energy storage capacities; accordingly, operation of such radio telephones by a single battery power source, even one of an increased energy storage capacity, is limited. After an extended period of use (such period of operation dependent upon the energy storage capacity of the battery), the battery must be replaced with a fresh battery or the battery must be recharged. In order to recharge the battery, a battery charger is required to supply the rechargeable battery, once depleted of stored energy, with a charging current. For the same reasons for which a reduction in the physical dimensions of electronic devices are desirable, a reduction in the physical dimensions of a battery charger operative to recharge a rechargeable battery is also desirable.

The battery charger must also be capable of receiving a battery of any of various energy storage capacities and, hence, physical dimensions.

What is needed, therefore, is a battery charger construction of minimal dimensions permitting recharging of any of many differently-sized rechargeable batteries.

SUMMARY OF THE INVENTION

The present invention, accordingly, advantageously provides a battery charger assembly capable of applying a charging current to any one of many differently-sized batteries.

The present invention further advantageously provides an associated method for a battery charger for applying a charging current to any one of many differently-sized, rechargeable, battery power supplies.

The present invention includes further advantages and features, the details of which will become more apparent by reading the detailed description of the preferred embodiments hereinbelow.

In accordance with the present invention, therefore, a battery charger assembly, and associated method, for applying a charging current to at least one battery cell disposed in a battery pack when positioned at a charging position is disclosed. The battery charger assembly includes a housing body portion having a face surface defining a receiving area thereat. Charging circuitry is supportively positioned at the receiving platform area defined upon the face surface of the housing body. The charging circuitry has coupling electrodes positioned at a front side of the housing body portion for abutting against corresponding contacts of the battery pack when the battery pack is positioned at the charging position. A first gripper arm is hingedly-connected to the housing body portion and positioned such that a distal end portion thereof extends beyond the front side of the housing body portion. A second gripper arm is hingedly-connected to the housing body portion and is positioned such that a distal end portion thereof extends beyond the front side of the housing body portion. At least one spring member is supported at the housing body portion for generating spring forces upon the first and second gripper arms, thereby to urge the distal end portions of the first and second gripper arms towards one another such that, when the battery pack is positioned at the charging position, the first and second gripper arms grippingly engage the battery pack to maintain the battery pack is position thereby.

BRIEF DESCRIPTION OF THE DRAWINGS

The present invention will be better understood when read in light of the accompanying drawings in which:

FIG. 4 is an overhead view, in isolation, of the battery charger assembly of the preferred embodiment of the present invention; and FIG. 5 is an overhead view, similar to that of FIG. 4, but illustrating the relationship between the gripper arms of the battery charger assembly of the preceding figures, and a rechargeable, battery power supply when positioned at a charging position to be charged with a charging current thereat.

DESCRIPTION OF THE PREFERRED EMBODIMENT

Figure 1:
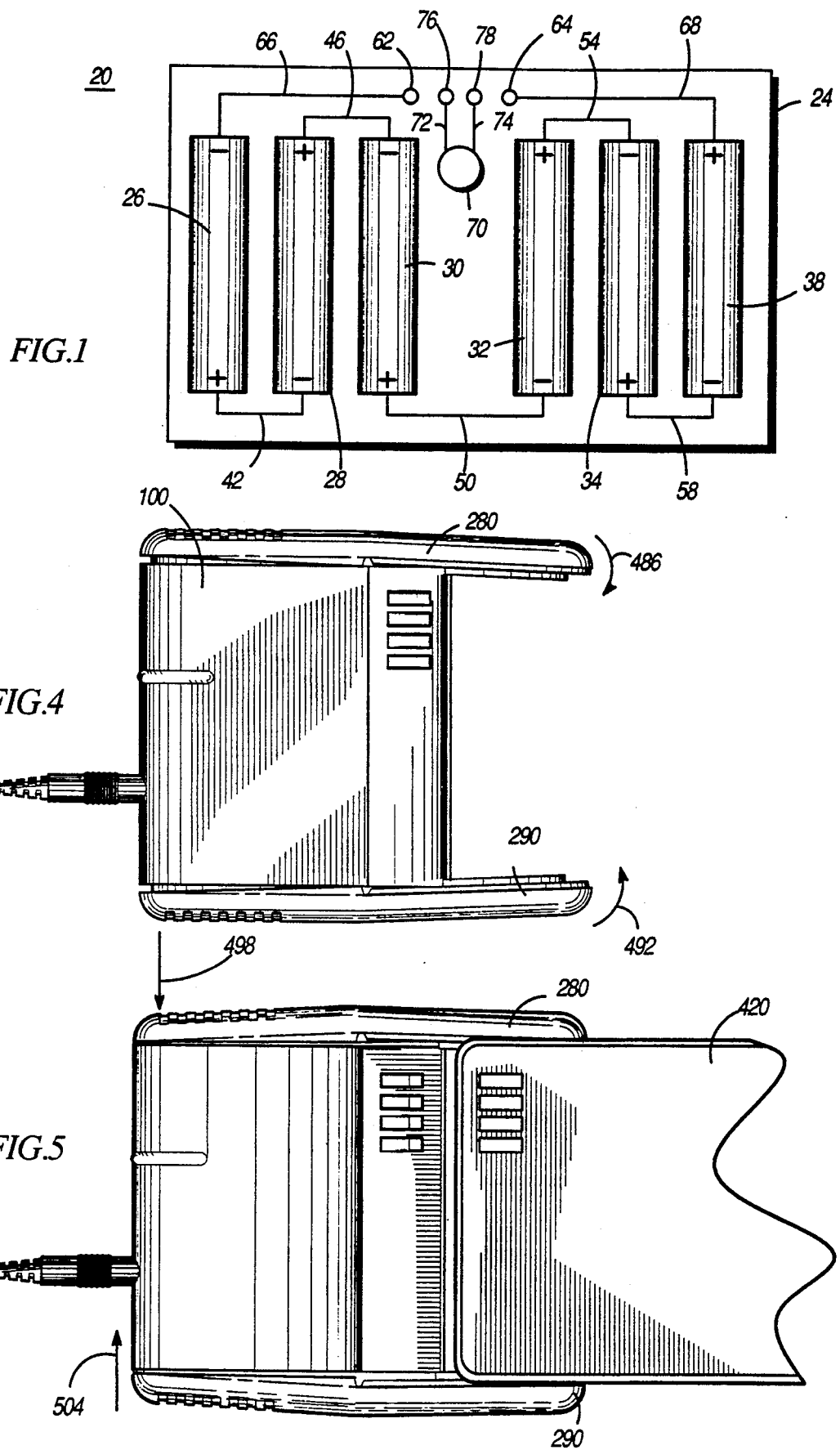
FIG. 1 is a partial circuit, partial schematic diagram of a battery pack formed of six discreet battery cells connected in a series connection therebetween.

Referring first to the partial circuit, partial schematic diagram of FIG. 1, a battery pack, referred by generally by reference numeral 20, is shown. Battery pack 20 is comprised of housing 24 which is of a construction permitting supportive housing of battery cells therewithin. Battery pack 20 of FIG. 1 is comprised of 6 battery cells 26, 28, 30, 32, 34, and 38. Battery cells 26-38 are of constructions to permit recharging thereof by application of a fast charging current thereto, and are here preferably comprised of either a nickel-cadmium material or a nickel metal hydride material. Battery cells comprised of other materials are similarly possible.

As indicated in the figure, each battery cell 26-38 is bipolar in construction, and is formed of a cathodic portion (indicated by plus signs at first sides of each of the cells 26-38), and an anodic portion (indicated by minus signs at second sides of each of the cells 26-38).

A first side of battery cell 26 is coupled to a second side of battery cell 28 by connector 42; a first side of battery cell 28 is coupled to a second side of battery cell 30 by connector 46; a first side of battery cell 30 is coupled to a second side of battery cell 32 by connector 50; a first side of battery cell 32 is coupled to a second side of battery cell 34 by connector 54; and a first side of battery cell 34 is coupled to a second side of battery cell 38 by connector 58. Output terminals 62 and 64 are coupled to sides of battery cells 26 and 38 by connectors 66 and 68, respectively. Output terminals 62 and 64 form electrical contacts suitable for connection to an electrical device, such as a radiotelephone, to power the device with the stored energy of cells 26–38 of battery pack 20.

Battery packs comprised of other numbers of battery cells (and other configurations thereof—i.e., series or parallel connections of the battery cells) include connectors for coupling the battery cells theretogether as necessary. Although battery cells 26–38 of FIG. 1 are configured in a series connection, cells 26–38 may alternately be configured in a parallel connection, or a combination of parallel and series connections. The number of battery cells and their respective connections theretogether is dependent upon the construction of the battery cells utilized and the voltage and current requirements of the electrical device powered by the battery pack.

Battery pack 20 further includes thermistor 70 having leads 72 and 74 coupled to the electrodes 76 and 78, respectively. Because thermistor 70 is housed within housing 24 of the battery pack, thermistor 70 is operative to provide indications of temperature levels of the battery cells, here cells 26–38, of battery pack 20.

As mentioned hereinabove, battery power supplies operative to provide power to operate a portable radiotelephone may be of any of many different energy storage capacities and sizes. As the widthwise and lengthwise dimensions of such differently-sized battery power supplies are of fixed, maximum dimensions, increase in the energy storage capacity of the battery power supply is effectuated by increasing the height of such battery power supply.

Figure 2:
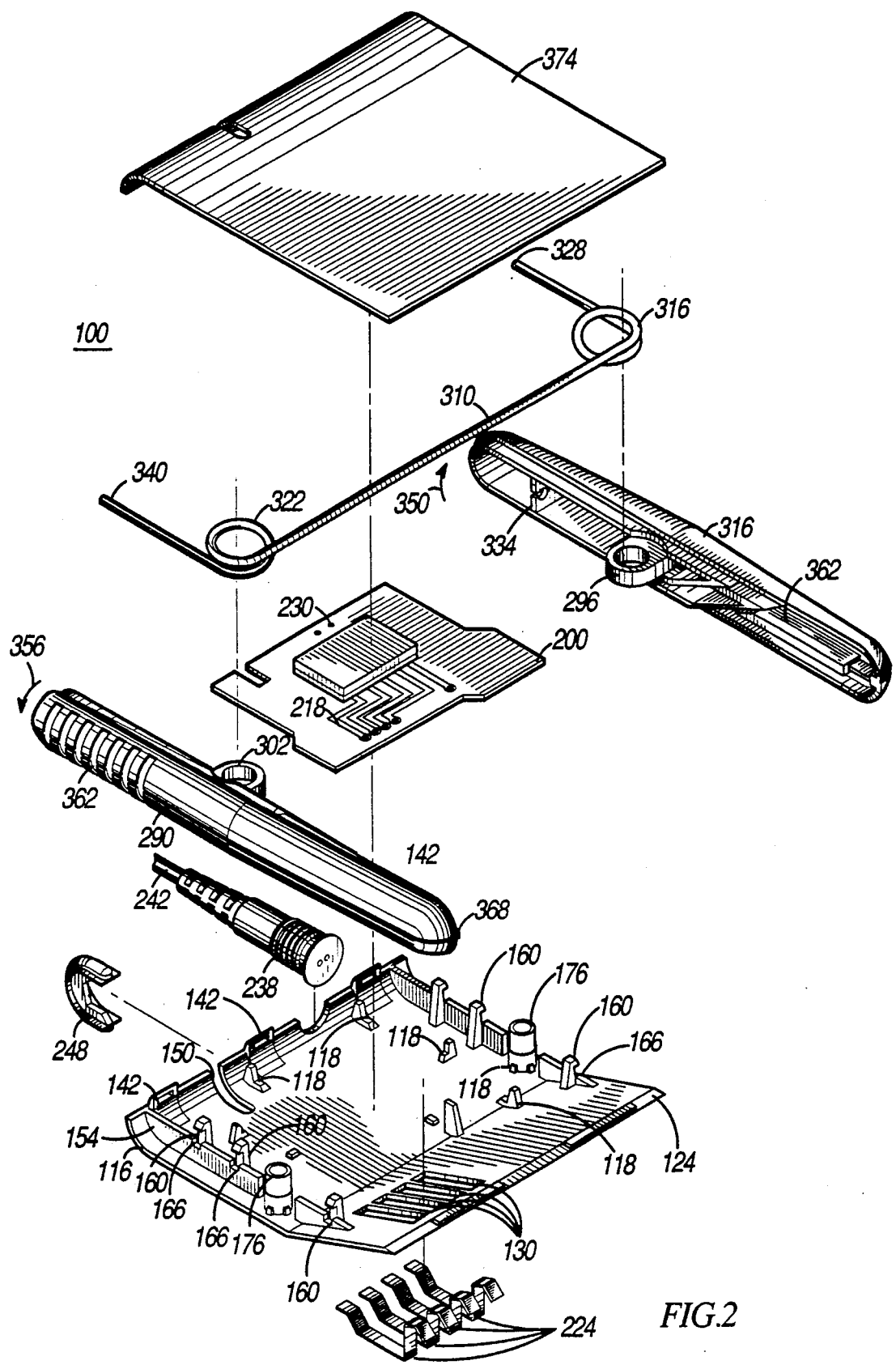
FIG. 2 is an exploded view of the battery charger assembly of the preferred embodiment of the present invention.

Turning next to the exploded view of FIG. 2, the battery charger assembly, referred to generally by reference numeral 100, of the preferred embodiment of the present invention is shown. Battery charger assembly 100 is operative to apply a charging current to any of many of various, differently-sized, rechargeable, battery power supplies.

Battery charger assembly 100 includes housing body portion 106 having a flat planar surface forming a receiving platform area 112. Numerous support shoulders 118 are formed about peripheral portions of receiving platform area 112 defined upon the flat surface area of housing body portion 106. Each of the support shoulders 118 includes a planar ledge portion positioned at similar heights above the face surface of housing body portion 106 at which receiving platform area 112 is defined.

Formed to extend at an angle beyond a front side portion of the face surface of housing body portion 106 defining receiving platform area 112 is front side wall 124. Front side wall 124 extends substantially the entire length along the front side of the face surface of housing body portion 106. A series of vertically-extending apertures 130 extend through front side wall 124.

Similarly, rear side wall 136 is formed to extend beyond a rear side of the face surface of housing body portion 106. Three fastener clasps 142 are further formed at rear side wall 136 to extend beyond a top surface thereof. A center section of rear side wall 136 is of a decreased elevation above the flat surface portion of housing body portion 106. Such section of rear side wall 136 forms support notch 148. Slotted notch 150 is further formed along rear side wall 136.

Support bars 154 extend between front side wall 124 and rear side wall 136 at opposing sides of the flat surface portion of housing body portion 106. Spaced-apart hook members 160 formed to extend upwardly beyond the face surface of housing body portion 106 at spaced-intervals at locations proximate to support bars 154. Notches 106 are formed in support bars 154 at locations along the lengths of the respective bars 154 corresponding to the positions at which hook members 160 are located.

Upwardly-extending cylinder arms are also formed to extend beyond the flat surface portion of housing body portion 106 at opposing sides of such flat surface portion. In the preferred embodiment, cylinder arms 176 are somewhat tapered to form truncated conical sections thereby. Horizontal cross-sections taken through each cylinder arm 176 are circular in nature. As further illustrated in the figure, a plurality of shoulder portions 118 are formed about circumferential portions of each of the cylinder arms 176.

Circuit board 200 is positioned above housing body portion 106 in the exploded view of battery charger assembly 100 of FIG. 1. Circuit board 200 is of dimensions permitting placement thereof at receiving platform area 112 defined upon housing body portion 106. More particularly, in the preferred embodiment, a bottom, face surface of circuit board 200 seats upon ledge portions defined upon various ones of support shoulders 118 positioned about the periphery of receiving platform area 112. Support shoulders 118 thereby support circuit board 200 in position at receiving platform area 112.

Charging circuitry 212, shown in block form, is disposed upon circuit board 200. Charging circuitry 212 is operative to generate a charging current of desired characteristics, which, when applied to a rechargeable battery power supply, comprises the charging current to recharge the battery power supply thereby. In the figure, lines 218 extending from charging circuitry 212 form input and output lead-lines extending to and from charging circuitry 212.

When circuit board 200 is suitably supported by support shoulders 118 at receiving platform area 112, coupling electrodes 224 are coupled to respective ones of the lead-lines 218. (Alternately, coupling electrodes 224 may be connected to lead-lines 218 prior to positioning of circuit board 200 at receiving platform area 112 by way of, for example, solder connections.) Coupling electrodes 224 are of dimensions permitting insertion of such electrodes 224 through apertures 130 formed to extend through front side wall 124. Coupling electrodes 224 are operative thereby to engage with corresponding contacts of a battery power supply when positioned in abutting engagement therewith.

Terminals 230 are also affixed to circuit board 200 and thereby to charging circuitry 212. When circuit board 200 is properly supported at receiving platform area 112, terminals 230 are operative to permit coupling with mated, socket connector 238 formed at a first end portion of electrical cable 242. A second end portion (not illustrated in the figure) of cable 242 forms a plug connector permitting connection to a conventional, household electrical outlet. Electrical cable 242 thereby forms a conduit for providing charging circuitry 212 with operative power to permit operation thereof.

Lens element 248 is further illustrated; lens element 248 is of dimensions permitting seating thereof at a surface formed of slotted-notch 150 thereat to permit external illumination of a light emitting diode (not shown in the figure) positioned upon circuit board 200 which is illuminated during operation of charging circuitry 212. Slotted opening 252 is further formed upon circuit board 200 to assist in maintaining lens element 248 in position at slotted notch 150 of housing body portion 106.

Battery charger assembly 100 of FIG. 2 further comprises first and second gripper arms 280 and 290, respectively. Gripper arms 280 and 290 are elongated along longitudinal axes of the respective gripper arms 280 and 290. Ring member 296 is formed to extend beyond an inner face surface of first gripper arm 280 midway along the length of the gripper arm. Ring member 296 divides first gripper arm 280 into a distal end portion and a proximal end portion. The distal end portion of gripper arm 280 is formed at the right-hand side portion of the gripper arm 280 of FIG. 2 and the proximal side portion of the gripper arm is formed at the left-hand side portion of gripper arm 280 of FIG. 2.

Ring member 296 is of an inner diameter permitting positioning of the ring member 296 about a cylinder arm 176 formed at a side portion of the face surface of housing body portion 106. In the preferred embodiment, the inner diameter of ring member 296 is somewhat conical in configuration corresponding to the conical configuration of cylinder arm 176. When ring member 296 is positioned about cylinder arm 176, a bottom surface of the ring member seats upon a ledge formed of a portion of the support shoulders 118 positioned about the circumference of the cylinder arm 176. When suitably positioned about cylinder arm 176, first gripper arm 280 is permitted limited pivotal movement thereabout. Such pivotal movement, however, is limited by abutment of an inner face surface of the gripper arm 280, either along the distal end portion or proximal end portion thereof against a side surface of support bar 154 or a side surface of front side wall 124.

Similarly, ring member 302 is formed to extend beyond an inner face surface of second gripper arm 290 midway along the length of the gripper arm. Ring member 302 is also of an inner diameter permitting positioning of the ring member about cylinder arm 176 formed at a side of the face surface of housing body portion 106. Again, the inner diameter of ring member 302 is somewhat conical in configuration corresponding to the conical configuration of cylinder arm 176 in the preferred embodiment. When ring member 302 is properly positioned about cylinder arm 176, a bottom face surface of ring member 302 seats against ledge portions of support shoulders 118 positioned about a circumference of cylinder arm 176. Ring member 302 is thereby permitted limited rotational movement about cylinder arm 176, resulting in limited pivotal movement of second gripper arm 290 thereabout. Again, pivotal movement of the second gripper arm 290 is limited by abutment of an inner face surface of the gripper arm 290, either along the distal end portion thereof or the proximal end portion thereof, against a corresponding face surface of support bar 166 or a side surface of front side wall 124.

Proximal end portions of first gripper arm 280 and second gripper arm 290 are of heights substantially corresponding to a height of front side wall 124 such that the proximal end portions of gripper arms 280 and 290 form side walls extending along opposing sides of the flat face surface of housing body portion 106. Hook members 160 form supports for supporting the proximal end portions of gripper arms 280 and 290 while permitting limited pivotal movement of the gripper arms 280 and 290.

Spring member 310 having first coil loop portion 316 and second coil loop portion 322 also forms a portion of the battery charger assembly 100 of the preferred embodiment of the present invention. First end 328 of spring member 310 seats against an inner face surface of the proximal end portion of first gripper arm 280. Notch 334 is formed upon such inner face surface to assist in the seating of first end 328 of spring 310 thereat. Analogously, second end 340 of spring 310 seats against an inner face surface of the proximal end portion of second gripper arm 290. While hidden from view in the figure, a notch, corresponding to notch 334 is also formed upon the inner face surface of second gripper arm 290 to assist in seating of second end 340 thereat.

The elongated midsection of spring member 310 is of a length substantially corresponding to the width of the flat surface portion of housing body portion 106. Thereby, first coil loop portion 316 may be positioned about a first cylinder arm 176 and second coil loop portion 322 may be positioned about a second cylinder arm 176. Spring member 310 is thereby maintained in position upon housing body portion 106. When gripper arms 280 and 290 are positioned at opposing side portions of housing body portion 106 and spring member 310 is positioned such that first and second end portions 328 and 340 are seated against inner face surfaces of the respective gripper arms 280 and 290, spring forces are exerted by such ends 328 and 340 upon the gripper arms 280 and 290 to urge the gripper arms in the directions indicated by arrows 350 and 356, respectively, as a result of twisting moments formed by such spring forces.

A portion of a outer face surface of second gripper arm 290, here indicated by block portion 362, forms a force receiving surface thereat. (A similar portion of the outer face surface of the proximal end portion of first gripper arm 280, while hidden from view in the figure, similarly forms a force receiving surface.) Forces exerted upon such force receiving surfaces form twisting moments which, when of magnitudes greater than twisting moments formed by the spring forces in the directions indicated by arrows 350 and 356, result in pivotal movement of the gripper arms 280 and 290 in directions reverse to those of arrows 350 and 356.

Formed to extend along inner face surfaces of the distal end portions of first and second gripper arms 280 and 290 are blade members 362 and 368. (Only a tip portion of blade member 368 formed to extend along second gripper arm 290 is shown in the figure.) As shall be noted more fully hereinbelow, blade members 362 and 368 are of dimensions permitting engagement thereof with corresponding grooves formed to extend along the outer portions of a battery back.

Battery charger assembly 100 of FIG. 2 further includes cover plate 374 of widthwise and lengthwise dimensions substantially corresponding to the widthwise dimensions of housing body portion 106 and the combination of lengths of such housing body portion 106 together with the length of front side wall 124. Cover plate 374 forms a cover for covering charging circuitry 212 and circuit board 200 when suitably positioned at the receiving platform area 112 of housing body portion 106. While not shown in the figure, a rear side surface of cover plate 374 includes fasteners for fastening cover plate 374 to fastener clasps 142 formed upon rear side wall 136. Housing body portion 106 together with front and rear side walls 136, side walls formed of the proximal end portions of first and second gripper arms 280 and 290, and cover plate 374 together form a supportive enclosure for enclosing the charging circuitry 212 mounted upon circuit board 200 therewithin.

Figure 3:
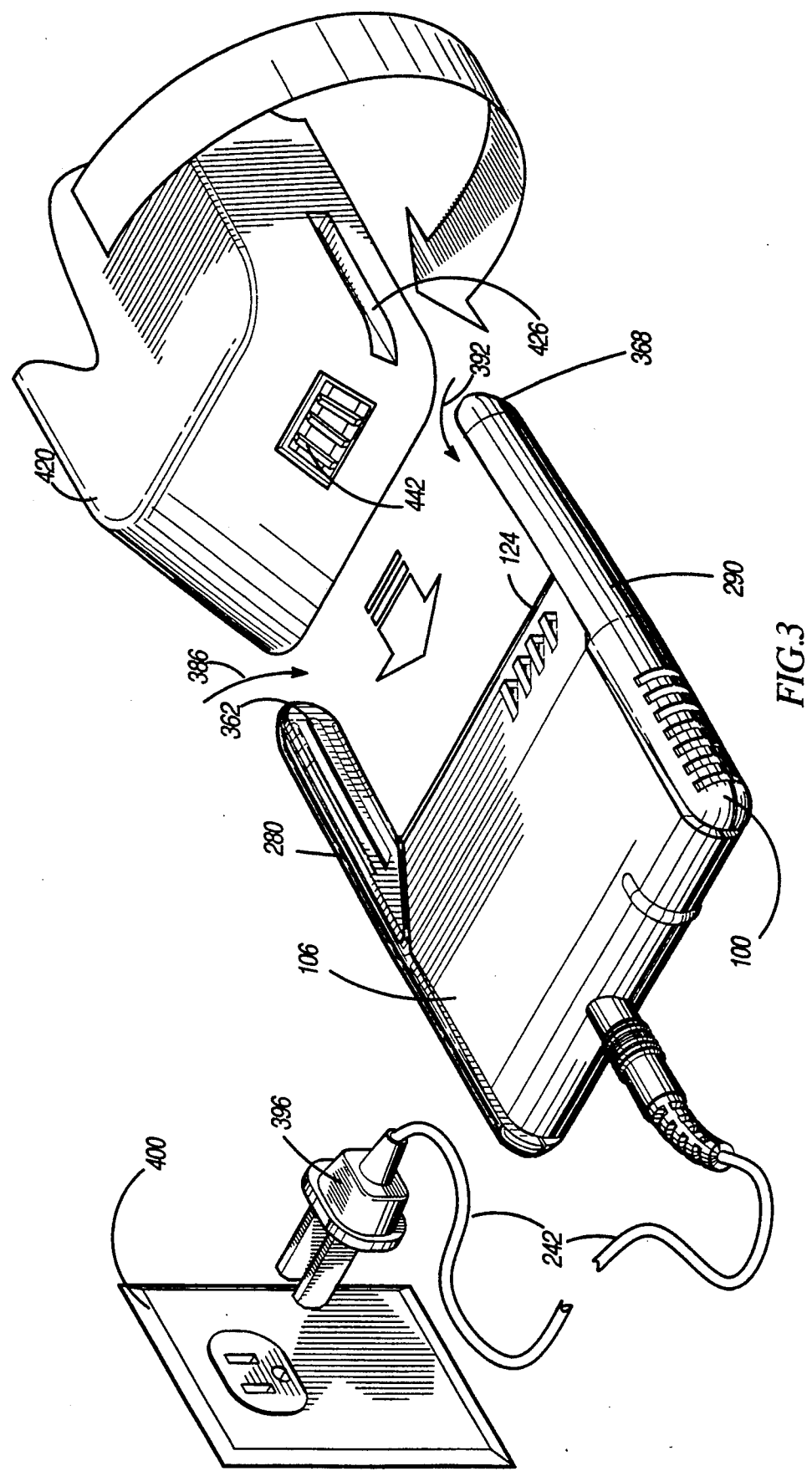
FIG. 3 is a perspective view of the battery charger assembly shown in exploded form in FIG. 2 positioned proximate to a rechargeable, battery power supply.

Turning next to the perspective view of FIG. 3, battery charger assembly 100 shown in the exploded view of FIG. 2, is again shown. First and second gripper arms 280 and 290 extend beyond a front side surface of housing body portion 106. Because of the spring forces exerted upon proximal end portions of gripper arms 280 and 290, distal end portion of the respective gripper arms 280 and 290 are urged towards one another in directions indicated by arrow 386 and 392. Electrical cable 242 extends beyond a rear side of housing body portion 106, and a plug connector 396 positioned at a second end side of cable 242 is positioned proximate to electrical outlet 400. When properly connected, power provided by electrical outlet 400 is supplied to the charging circuitry housed within housing body portion 106. As noted previously, the charging circuitry generates a charging current of desired characteristics and supplies such charging current to coupling electrodes formed to extend through a front side wall extending beyond housing body portion 106.

Battery pack 420 is further illustrated in the perspective view of FIG. 3 at a location just beyond the distal ends of first and second gripper arms 280 and 290. Battery pack 420, may, for example, be similar in construction to battery pack 20 shown in FIG. 1. Longitudinally extending grooves extend along opposing side walls of battery pack 420. (Only a single groove 426 is illustrated in the view of the figure.) Such grooves engage with blade members 362 and 368 disposed upon the inner face surfaces of the distal end portions of gripper arms 280 and 290, respectively.

By translating battery pack 420 in the direction indicated by arrow 432, rear side surface 436 of battery pack 420 abuts against front side wall 124 extending beyond housing body portion 106. In the preferred embodiment, rear side wall 436 and front side wall 124 are formed to extend in similar angular directions, thereby to permit abutting engagement of the two side walls along the face surfaces thereof. Contacts 442 are also disposed upon the rear side wall 436 of battery pack 420. Contacts 442 correspond in number and alignment with coupling electrodes 224 extending through front side wall 124. When translated in the direction indicates by arrow 432, blade members 362 and 368 engage with corresponding grooves, such as groove 426, formed along opposing side walls of battery pack 420. Continued translation of battery pack 420 positions the battery pack at a charging position whereat the rear side wall 436 of battery pack 420 abuts against front side wall 124 of battery charger assembly 100. When positioned in such abutting engagement, coupling electrodes 224 abut against contacts 442 of battery pack 420. When positioned at such charging position, a charging current generated by charging circuitry housed within housing body portion 106 of battery charger assembly 100 is applied to the battery cells disposed within battery pack 420 by way of contacts 442.

Because spring forces exerted upon the gripper arms 280 and 290 urge the distal end portions of such gripper arms towards one another, the gripper arms 280 and 290 grip opposing side surfaces of battery pack 420 to maintain the battery pack 420 at the charging position. Because battery charger assembly 100 is comprised of charging circuitry housed within a housing body portion and two gripper arms extending therefrom, assembly 100 is of minimal dimensions while still permitting charging currents to be applied to the battery pack to charge the battery pack thereby.

FIGS. 4 and 5 are overhead views of battery charger assembly 100 and are shown to illustrate the relationship of gripper arms 280 and 290 to battery pack 420. FIG. 4 illustrates assembly 100 when no battery pack is positioned at the charging position to charge the battery pack thereby. Spring forces exerted by spring member 310 shown in FIG. 2 form twisting moments causing pivotal movement about the hinged connections of gripper arms 280 and 290 to housing body portion 106, thereby to urge the distal end portions of gripper arms 280 and 290 towards one another in the directions indicated by arrows 486 and 492. FIG. 5 illustrates the relationship of gripper arms 280 and 290 to battery pack 420 when the battery pack is positioned at the charging position to receive the charging current generated by the charging circuitry of the charger assembly. The twisting moments formed by the spring forces exerted upon the gripper arms 280 and 290 form a gripping force exerted upon the opposing sides of battery pack 420, thereby to maintain battery pack 420 at the charging position.

In order to release the battery pack 420 from the charging position, forces are exerted upon the force receiving surfaces formed of the outer side surfaces of the proximal end portions of gripper arms 280 and 290 in directions indicated by arrows 498 and 504. Upon application of forces in the directions of arrow 498 and 504, the gripping forces are no longer exerted upon battery pack 420 and the battery pack may be released from the charging position.

While the present invention has been described in connection with the preferred embodiments shown in the various figures, it is to be understood that other similar embodiments may be used and modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. A battery charger assembly for applying a charging current to at least one battery cell disposed in a battery pack when positioned at a charging position, said battery charger assembly comprising:

a housing body portion having a face surface defining a receiving platform area thereat;

charging circuitry supportively positioned at the receiving platform area defined upon the face surface of the housing body, the charging circuitry having coupling electrodes positioned at a front side of the housing body portion for abutting against corresponding contacts of the battery pack when the battery pack is positioned at the charging position;

a first gripper arm hingedly-connected to the housing body portion and positioned such that a distal end portion thereof extends beyond the front side of the housing body portion;

a second gripper arm hingedly-connected to the housing body portion and positioned such that a distal end portion thereof extends beyond the front side of the housing body portion;

at least one spring member supported at the housing body portion for generating spring forces upon the first and second gripper arms, respectively, thereby to urge the distal end portions of the first and second gripper arms towards one another such that, when the battery pack is positioned at the charging position, the first and second gripper arms grippingly engage the battery pack to maintain the battery pack in position thereat.

2. The battery charger assembly of claim 1 further comprising means, extending beyond the receiving platform defined by the face surface of the housing body portion, for supporting the charging circuitry in position at the receiving platform area.

3. The battery charger assembly of claim 1 wherein said housing body portion further comprises a front side wall extending beyond a front edge of the face surface defining the receiving platform area at an angle permitting abutting engagement thereof with a corresponding portion of the battery pack when the battery pack is positioned at the charging position.

4. The battery charger assembly of claim 3 wherein said front side wall of the housing body portion further comprises at least one aperture permitting extension of the coupling electrodes of the charging circuitry therethrough.

5. The battery charger assembly of claim 3 further comprising a housing body portion cover plate supportable above the receiving platform area.

6. The battery charger assembly of claim 1 further comprising an electrical circuit board upon which at least a portion of the charging circuitry is disposed.

7. The battery charger assembly of claim 1 wherein the housing body portion further defines a first side and said first gripper arm is positioned at said first side of the housing body portion to extend beyond the front side portion of the housing body portion.

8. The battery charger assembly of claim 7 wherein said first gripper arm is hingedly-connected to the housing body portion at a location between the distal end portion and a proximal end portion thereof.

9. The battery charger assembly of claim 8 further comprising a first hinge comprised of an upwardly-extending cylinder arm affixed to the housing body portion and a ring member extending beyond a side surface of the first gripper arm at the location between the distal and proximal end portion thereof, the ring of dimensions permitting positioning thereof about the cylinder arm, thereby to hingedly-connect the first gripper arm to the housing body portion.

10. The battery charger assembly of claim 9 wherein the proximal end portion of the first gripper arm extends along substantially an entire length of the first side of the housing body portion.

11. The battery charger assembly of claim 10 wherein the first gripper arm further defines an inner face surface and a first end of said at least one spring member seats against the inner face surface of the first gripper arm thereby to generate a spring force which forms a twisting moment to urge rotation of the first gripper arm about the first hinge, and thereby to cause the first gripper arm to grippingly engage the battery pack when the battery pack is positioned at the battery charging position.

12. The battery charger assembly of claim 10 further comprising a force receiving surface formed upon an outer face surface of the proximal end portion of the first gripper arm whereat a force applied thereto forms a twisting moment in a direction opposite to that of the twisting moment formed by the spring force which, when of a magnitude greater than that of the twisting moment formed by the spring force, urges rotation of the first gripper arm about the first hinge in the direction opposite to that of the twisting moment formed by the spring force.

13. The battery charger assembly of claim 12 further comprising a longitudinally-extending blade member formed to extend along at least a portion of an inner face surface of the distal end portion of the first gripper arm, the longitudinally-extending blade member for engaging with a corresponding longitudinally-extending groove formed to extend along the battery pack.

14. The battery charger assembly of claim 1 wherein the housing body portion further defines a second side and said second gripper arm is positioned at said second side of the housing body portion to extend beyond the front side portion of the housing body portion.

15. The battery charger assembly of claim 14 wherein said second gripper arm is hingedly-connected at a location between the distal end portion thereof and a proximal end portion thereof to the housing body portion.

16. The battery charger assembly of claim 15 further comprising a second hinge comprised of an upwardly-extending cylinder arm affixed to the housing body portion and a ring member extending beyond a side surface of the second gripper arm at the location between the distal and proximal end portions, respectively, thereof, the ring member of dimensions permitting positioning thereof about the cylinder arm, thereby to hingedly-connect the second gripper arm to the housing body portion.

17. The battery charger assembly of claim 16 wherein the proximal end portion of the second gripper arm extends along substantially an entire length of the first side of the housing body portion.

18. The battery charger assembly of claim 17 wherein the housing body portion further defines an inner face surface and a second end of said at least one spring member seats against the inner face surface of the second gripper arm thereby to generate a spring force which forms a twisting moment to urge rotation of the second gripper arm about the second hinge, and thereby to cause the second gripper arm to grippingly engage the battery pack when the battery pack is positioned at the battery charging position.

19. The battery charger assembly of claim 18 wherein the proximal end portion of the second gripper arm further defines an outer face surface and wherein a force receiving surface is formed upon said outer face surface of the proximal end portion of the second gripper arm whereat a force applied thereto forms a twisting moment in a direction opposite to that of the twisting moment formed by the spring force which, when of a magnitude greater than that of the twisting moment formed by the spring force, urges rotation of the second gripper arm about the second hinge in the direction opposite to that of the twisting moment formed by the spring force.

20. The battery charger assembly of claim 19 further comprising a longitudinally-extending blade member formed to extend along at least a portion of an inner face surface of the distal end portion of the second gripper arm, the longitudinally-extending blade member for engaging with a corresponding, longitudinally-extending groove formed to extend along the battery pack.

* * * * *